US006969975B2

(12) United States Patent
Mayer et al.

(10) Patent No.: US 6,969,975 B2
(45) Date of Patent: Nov. 29, 2005

(54) CIRCUIT ARRANGEMENT FOR POWER FACTOR CORRECTION

(75) Inventors: Siegfried Mayer, Moosinning (DE); Arwed Storm, Dachau (DE)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 0 days.

(21) Appl. No.: 10/502,586

(22) PCT Filed: Jul. 29, 2002

(86) PCT No.: PCT/DE02/02563

§ 371 (c)(1),
(2), (4) Date: Jul. 27, 2004

(87) PCT Pub. No.: WO03/067743

PCT Pub. Date: Aug. 14, 2003

(65) Prior Publication Data

US 2005/0104563 A1 May 19, 2005

(30) Foreign Application Priority Data

Feb. 8, 2002 (DE) ............................... 102 05 516

(51) Int. Cl.[7] .............................................. G05F 1/70
(52) U.S. Cl. .................................................... 323/207
(58) Field of Search .............................. 323/207, 225, 323/283

(56) References Cited

U.S. PATENT DOCUMENTS

| 4,683,529 | A |   | 7/1987  | Bucher, II               |
|-----------|---|---|---------|--------------------------|
| 5,568,041 | A | * | 10/1996 | Hesterman ........ 323/207|
| 6,208,085 | B1|   | 3/2001  | Lehnert et al.           |

FOREIGN PATENT DOCUMENTS

| DE | 199 23 238 | 1/2001 |
|----|-----------|--------|
| DE | 199 42 794 | 5/2001 |

* cited by examiner

*Primary Examiner*—Shawn Riley
(74) *Attorney, Agent, or Firm*—Carlo S. Bessone

(57) ABSTRACT

Power factor correction circuit includes an input having a first and second connecting terminal, a first switching element with a control electrode coupled to a current source, a reference electrode coupled to a reference potential and a working electrode, an inductive resistor coupled between the working electrode of the first switching element and the first connecting terminal. The circuit also includes an output having a first and second output terminal, a first diode coupled between the working electrode and the first terminal of the output, a second switching element with a control electrode, a reference electrode coupled to the reference potential and a working electrode, a first capacitor coupled between the control electrode of the second switching element and the working electrode of the first switching element, and a first ohmic resistance coupled between the first connecting terminal of the output and the control electrode of the second switching element.

11 Claims, 5 Drawing Sheets

CIRCUIT ARRANGEMENT FOR POWER FACTOR CORRECTION

TECHNICAL FIELD

The present invention relates to a circuit arrangement for power factor correction.

Power factor correction serves the purpose of reducing the harmonic content of the input current of a circuit arrangement. Depending on the power consumption of such a circuit arrangement, specific requirements apply in this case. The requirements for ballasts having a power consumption of more than 25 W are outlined, for example, in the standard EN 61000-3-2, Part A 14.

PRIOR ART

A circuit known from the prior art for power factor correction is described in DE 199 23 238.5.

Further circuit arrangements known from the prior art for power factor correction serve the purpose of driving a boost converter having integrated circuits, of driving a boost converter at a fixed frequency in intermittent operation using discrete components or of using a charge pump in the resonant circuit of a downstream converter without using an upstream converter for power factor correction.

The disadvantage of the circuit arrangements known from the prior art for power factor correction by means of a charge pump in the resonant circuit consists in the fact that they result, in particular in the case of electronic ballasts having higher ratings, in high wattless currents in the load circuit. The disadvantage of the arrangement known from the prior art using fixed-frequency driving in intermittent operation is the unfavorable noise spectrum according to EN 55015.

The object of the present invention is therefore to provide a circuit arrangement for power factor correction which does not have these disadvantages and, moreover, can be realized cost-effectively.

SUMMARY OF THE INVENTION

This object is achieved according to the invention by a circuit arrangement for power factor correction having the features of patent claim 1.

The invention is based on the knowledge that the above-described object can be achieved by a design using a self-oscillating boost converter in continuous operation. Power factor correction is achieved by means of the constant On time of the central switching element in the transition mode of operation. The constant On time and identification of the current zero crossing in the inductance as is required for operation in the transition mode is realized with minimum use of components. The provision of the first capacitor between the working electrode of the first switching element and the control electrode of the second switching element results in both the constant On time and in the first switching element being switched off in the zero crossing of the current in the inductance. At the same time, the first capacitor performs positive feedback in the switching phases and thus reduces the switching losses owing to steep switching edges.

The solution according to the invention also has the advantage that, as a result of the continuous operation and the resulting frequency modulation by the input voltage, the requirements placed on the components, including an upstream EMC filter, are minimized. If the circuit arrangement according to the invention is used for operating a lamp, in particular in interaction with a cold-start electronic ballast, the high lamp impedance during the glow phase in the circuit arrangement according to the invention does not result in a severe increase in the intermediate circuit voltage as would be the case, however, with pump circuits known from the prior art.

The current source, to which the control electrode of the first switching element is coupled, is preferably realized either by a second nonreactive resistor, which is coupled to the first connection terminal of the input and/or output, or by a separate low-voltage source having a series resistor.

A limiter network, for example realized by means of a first zener diode, is preferably connected in parallel with the first nonreactive resistor and/or the second switching element such that it can be used to limit the output voltage. This measure takes into account the fact that, in the case of the circuit arrangement according to the invention, during load shedding, for example during the starting phase or when removing a connected lamp during operation, the output voltage rises inversely proportional to the load. The parallel circuit comprising a first zener diode and the first nonreactive resistor prevents this by the input power being controlled downward when the zener voltage of this first zener diode is reached, to such an extent that the output voltage of the circuit arrangement cannot exceed the zener voltage. As an alternative to this, the output voltage can be limited using a limiter network in parallel with the second switching element or oscillation can be completely prevented when an output threshold voltage is reached.

The first switching element may comprise an nmos transistor, and/or the second switching element may comprise an npn transistor. Alternatively, the first switching element may comprise a pmos transistor, and/or the second switching element may comprise a pnp transistor.

The circuit arrangement is preferably designed such that, during a zero crossing of the current through the inductance, the first switching element opens. This measure prescribes a simple condition for starting an oscillation. The zero crossing of the charge current, which flows through the inductance and the first diode into the load circuit when the input voltage is applied, thus causes the circuit to start to oscillate.

A third nonreactive resistor is preferably coupled between the control electrode of the second switching element and the first connection terminal of the input. This additional path increases the length of the On time in the region of the zero crossing of the input voltage, which has an advantageous effect on the harmonic content of the input current.

The series circuit comprising a second diode and a second zener diode can preferably also be coupled between the control electrode and the reference electrode of the second switching element such that the second zener diode limits the voltage between the control electrode and the reference electrode of the second switching element in the reverse direction. The second diode prevents a current from flowing in the direction forward of the second zener diode. The reverse voltage of the zener diode critically determines the duration of the On time of the first switching element and thus, at a given load, the level of the output voltage. If the two diodes are dispensed with, the reverse voltage is determined by the negative breakdown voltage of the junction between the control electrode and the reference electrode of the second switching element.

Furthermore, the control electrode of the first switching element and the working electrode of the second switching element is preferably coupled to the reference potential by means of a third zener diode, the third zener diode being arranged such that it can be used to protect the control electrode of the first switching element against overvoltages.

Further advantageous embodiments are described in the subclaims.

BRIEF DESCRIPTION OF THE DRAWINGS

Exemplary embodiments of the invention will now be explained in more detail below with reference to the attached drawings, in which.

Identical elements and elements having identical functions in the various exemplary embodiments are given identical reference numerals throughout in the text which follows.

PREFERRED EMBODIMENTS OF THE INVENTION

Figure 1:
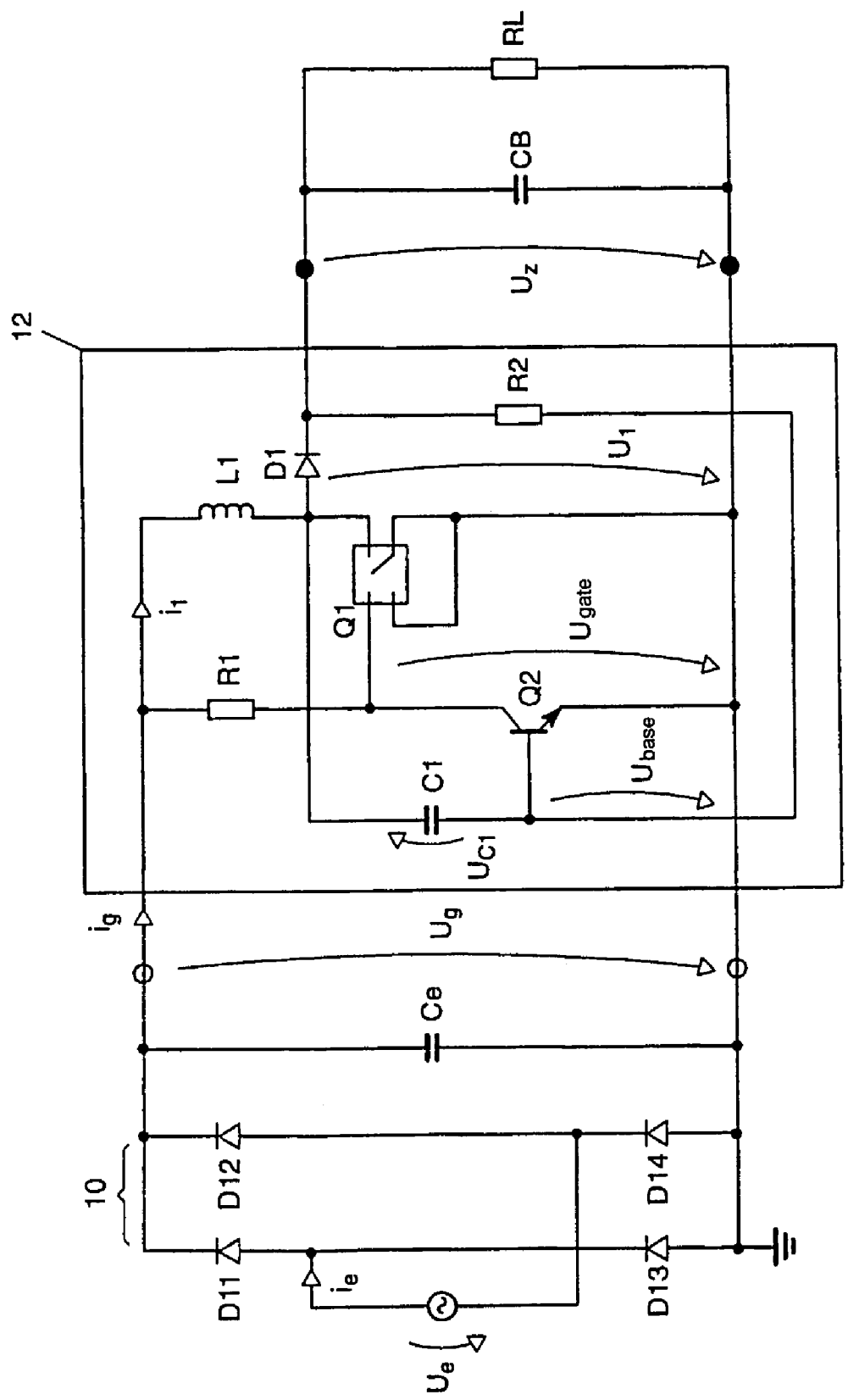
FIG. 1 shows a circuit diagram of a first embodiment of a circuit arrangement according to the invention.

Reference will first be made to the circuit arrangement according to the invention which is illustrated in FIG. 1. Without restricting the possible applications for the circuit arrangement according to the invention, it will be described below using the example of an arrangement for driving an electronic ballast for a lamp. The associated, basic signal characteristics can be seen in FIG. 3.

A voltage $u_e$ is made available to the circuit arrangement 12 according to the invention by a voltage source, in particular a system voltage source. Firstly, it supplies a current $i_e$ to a rectifier network 10, which comprises four diodes D11, D12, D13, D14. The voltage $u_g$ which is made available at the output of the rectifier network 10 is stabilized by a capacitor $C_e$ and supplied to the circuit arrangement 12 according to the invention for power factor correction.

The capacitor $C_1$ shall be charged at time $t_0$ to the negative base/emitter breakdown voltage of the transistor $Q_2$. The transistor $Q_2$ is thus in the off state, and the transistor $Q_1$ is in the on state via a pull-up resistor $R_1$, i.e. the voltage $u_1$ across the drain terminal of the transistor $Q_1$ is zero. The current $i_1$ through the inductance $L_1$ shall likewise be equal to zero at time $t_0$. The output voltage $u_z$ across the load $R_L$ shall be constant, for example with the aid of a sufficiently large bulk capacitor $C_B$.

The capacitor $C_1$ is now recharged via $R_2$ during the time $T_1 = t_1 - t_0$, $T_1$ being given by $$du_{C1}/T_1 = 1/C_1 * (u_z/R_2). \quad (1)$$

During the time period $T_1$, the current $i_1$ in the inductance $L_1$ rises linearly. The gradient of the current ramp is given by $$i_{1,max}/T_1 = 1/L_1 * u_g, \quad (2)$$

in which $u_g$ is the input voltage of the circuit arrangement according to the invention.

At time $t_1$, the voltage $u_{base}$ of transistor $Q_2$ reaches the forward voltage and switches the transistor $Q_2$ on. The voltage $u_{gate}$ of transistor $Q_1$ thus becomes zero, and the transistor $T_1$, for example a MOSFET here, turns off. At time $t_1$, the current $i_1$ through the inductance $L_1$ first commutates onto the capacitor $C_1$ and recharges said capacitor $C_1$ to the output voltage $u_z$. Then, the current $i_1$ commutates onto the rectifier diode $D_1$ and is thus supplied to the output circuit. Up to time $t_2$, the current $i_1$ in the inductance $L_1$ decreases linearly. The gradient of the negative current ramp can be calculated from $$i_{1,max}/T_2 = 1/L_1 * (u_g - u_z), \quad (3)$$

in which, disregarding an On time for the transistor T1, the following equation applies: $T_2 = t_2 - t_1$. At time $t_2$, the current zero crossing in the diode $D_1$ is reached, see FIG. 3b), and the diode $D_1$ turns off. The capacitor $C_1$ is discharged by means of the inductance $L_1$ and in this manner depletes the base of the transistor $Q_2$. The transistor $Q_2$ thus turns off, and the voltage $u_{gate}$ across the gate of the transistor $Q_1$ is pulled up by means of the pull-up resistor $R_1$. $Q_1$ thus turns on and pulls the voltage $u_1$ across its drain to zero. The capacitor $C_1$ is discharged by means of the drain/source junction of the transistor $Q_1$ up to the negative base/emitter breakdown voltage of the transistor $Q_2$. This positive feedback makes it possible for the transistor $Q_1$ to switch off rapidly, and thus minimizes the switching losses. The state at time $t_0$ is thus reached, and the cycle begins from the beginning.

The circuit arrangement according to the invention provides for the time $T_1 = t_1 - t_0$ to be constant independently of the input voltage $u_g$ and thus independently of the voltage $u_e$. It can be seen directly from equation (2) that in this case $i_{1,max}$ is proportional to the input voltage $u_g$. Furthermore, the rms value of the current $i_1$ is equal to the active component of the input current $i_g$. In continuous operation, the peak value for the current $i_1$ in the inductance $L_1$ is proportional to the input current $i_g$ according to the equation $$i_{1,max} = \sqrt{3} * i_g \quad (4)$$

The circuit principle in which the transistor $Q_1$ is opened again at the zero crossing of the current $i_1$ at time $t_2$ prescribes continuous operation. The condition for power factor correction is as follows:

$$u_e \sim i_e \quad (5)$$

and, from (3) and (4) where $u_g = |u_e|$ and $i_g = |i_e|$, is thus met by the circuit arrangement according to the invention.

To start the oscillation:

Once a voltage $u_g$ has been applied, the capacitor $C_1$ is charged by means of the inductance $L_1$ and the diode $D_1$. The base of the transistor $Q_2$ is driven via the resistor $R_2$ whilst the output voltage $u_z$ is built up, as a result of which the transistor $Q_2$ turns on. The voltage $u_{gate}$ across the gate of the transistor $Q_1$ is thus equal to zero and in this phase turns the transistor $Q_1$ off.

Once the capacitor $C_1$ has been recharged when the first voltage peak value for the input voltage has been reached, the current $i_1$ through the inductance $L_1$ passes through zero. As has already been explained above, this results in the capacitor $C_1$ being recharged and a cycle starting, as shown in FIG. 3. The circuit arrangement according to the invention thus begins to oscillate automatically once the input voltage has been applied.

With reference to the embodiment illustrated in FIG. 2 of a circuit arrangement according to the invention, further refinements of the circuit principle according to the invention are described below: the time $T_2$ decreases inversely proportionally to the increasing output voltage $u_z$. The input power is thus pulled back as the output voltage $u_z$ increases, which is advantageous for the circuit arrangement. In order to completely adjust the output voltage $u_z$ in the case of a resistive load, the input power would need, however, to be pulled back in proportion to the square of the output voltage $u_z$. This means that the output voltage $u_z$ during load shedding, for example during the starting phase of a lamp or when removing a lamp during operation, nevertheless increases inversely proportionally to the load. In order to prevent this, a zener diode $D_4$ can be introduced. Said zener diode $D_4$ is in parallel with the nonreactive resistor $R_2$ and limits the output voltage $u_z$ by the time $T_1$ and thus the input power being controlled downward when the zener voltage across the zener diode $D_4$ is reached, to such an extent that the output voltage $u_z$ cannot exceed the zener voltage of the diode $D_4$.

A nonreactive resistor $R_3$ is coupled between the control electrode of the second transistor $Q_2$ and the first connection terminal of the input. This resistor can be used to further reduce the harmonic content of the input current, since the converter cannot otherwise transmit any power in the region of the zero crossing of the input voltage when On times are too short.

Continuous operation of the circuit arrangement according to the invention is used to limit the current amplitude of the current $i_1$ to $i_{1,max} \sqrt{3}*i_g$. This reduces the requirements in terms of components, in particular for saturation of the inductance $L_1$.

The switching frequency f in the circuit arrangement according to the invention is $f=1/(T_1+T_2)$. Since, according to equation (3), $T_2$ is dependent on the input voltage $u_g$, the spectrum of the conducted, emitted noise during operation using the system voltage $u_e$ is smoothed. The lowest frequency is reached at high input voltages $u_g$. Since at high input voltages the highest currents $i_1$ in the inductance $L_1$ need to be disconnected, the circuit can be dimensioned such that, below the step change in the evaluation curve, this frequency is 50 kHz.

According to equation (1), the capacitor $C_1$, together with the nonreactive resistor $R_2$, determines the time constant $T_1$. The capacitor $C_1$, however, has even further advantageous functions in the circuit arrangement according to the invention:

The capacitor $C_1$ makes it possible to rapidly deplete the base of the transistor $Q_2$ at time $t_2$ by means of positive feedback in the switching phase.

Conversely, at time $t_1$, the capacitor $C_1$ assists, likewise by means of the effect of positive feedback, in switching the transistor $Q_2$ on and thus in a "hard" turn-off of the transistor $Q_1$. Depending on the dimensions, it may be necessary to protect the base of the transistor $Q_2$ against overcurrent when the capacitor $C_1$ is recharged, by means of two diodes $D_{2a}$, $D_{2b}$, see FIG. 2, in parallel with the base/emitter path of the transistor $Q_2$. The zener diode $D_{2b}$ limits the negative base/emitter voltage of the transistor $Q_2$. The time $T_1$ is thus independent of component scatter and temperature behavior of the breakdown voltage of the transistor $Q_2$.

The capacitor $C_1$ limits the edge steepness when the polarity of the voltage across the inductance $L_1$ is reversed.

The transistor $Q_2$ advantageously clamps the gate of the transistor $Q_1$ "hard" at zero volts. This is necessary for recharging the gate capacitance of the transistor $Q_1$ rapidly and for causing the transistor $Q_1$ to turn off rapidly. In addition, the switching losses in the transistor $Q_1$ can thus be kept low. Conversely, the transistor $Q_1$ is switched on by means of the pull-up resistor $R_1$. This may take place "softly", since the current $i_1$ in the inductance $L_1$ at this time must first be built up starting from zero.

Figure 2:
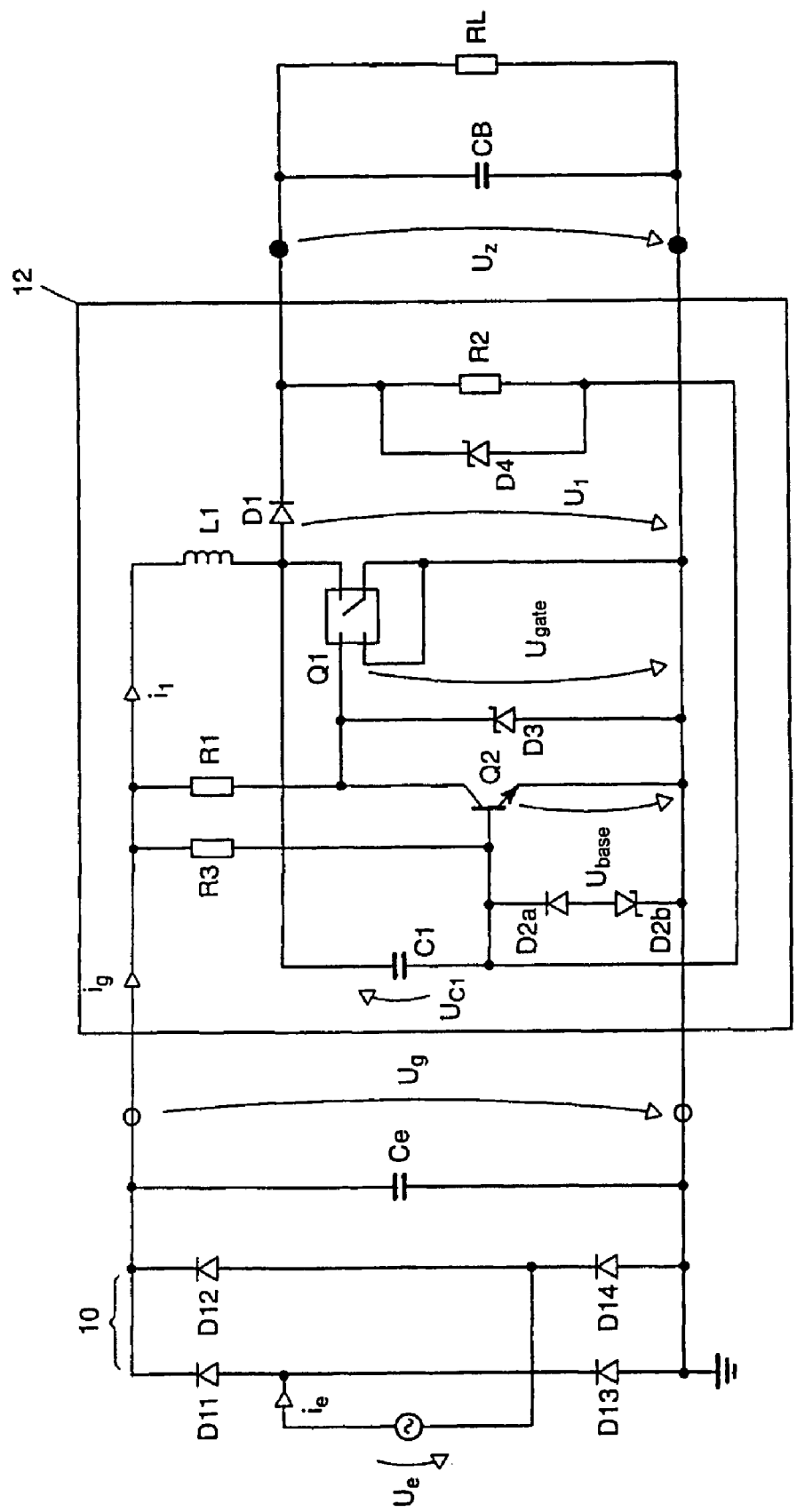
FIG. 2 shows a circuit diagram of a second embodiment of a circuit arrangement according to the invention.
Figure 3A:
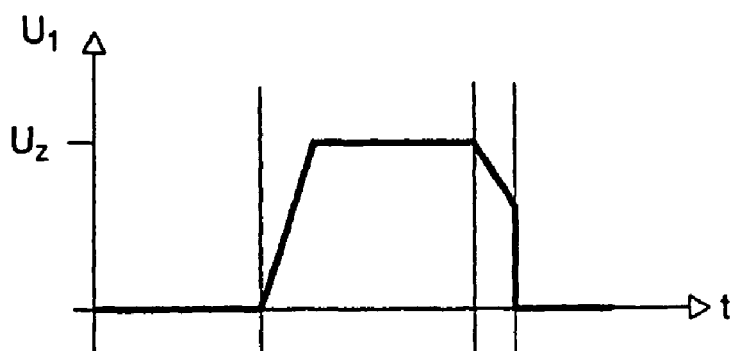
FIG. 3 shows a schematic illustration of the time characteristics of various signals in FIGS. 1 and 2.
Figure 3B:
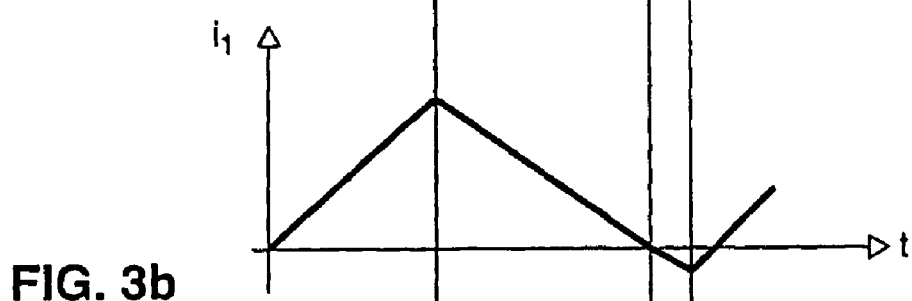
Figure 3C:
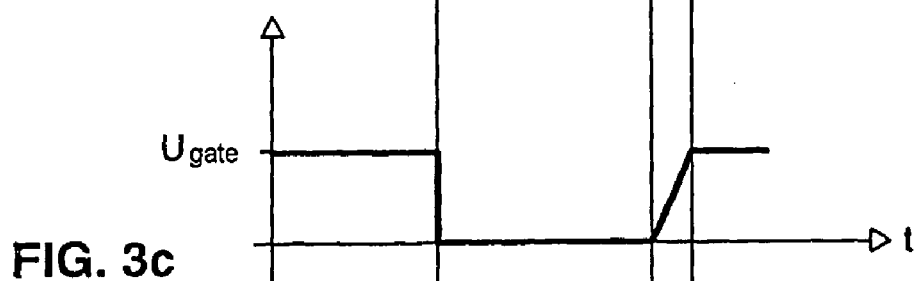
Figure 3D:
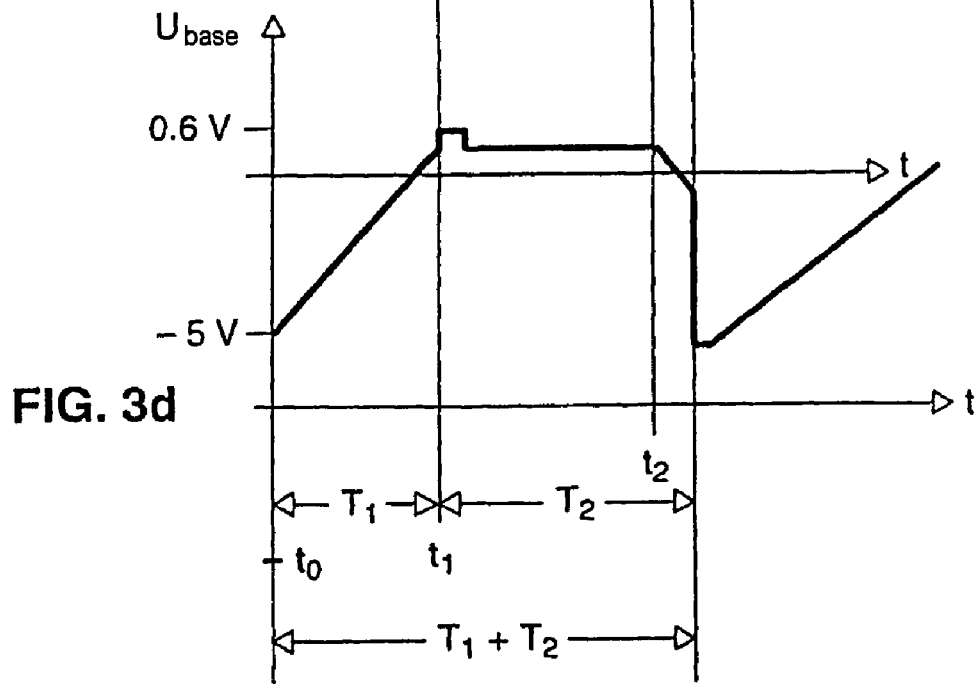

In order to protect the gate in this circuit against overvoltages, a zener diode $D_3$, see FIG. 2, can be connected between the gate terminal and the reference potential for the transistor $Q_1$.

In one advantageous development of the invention, the pull-up resistor $R_1$ is connected to an internal low-voltage supply. The zener diode $D_3$ may thus be dispensed with. Furthermore, this measure makes it possible to dispense with the high voltage requirements for the resistor $R_1$.

Figure 4:
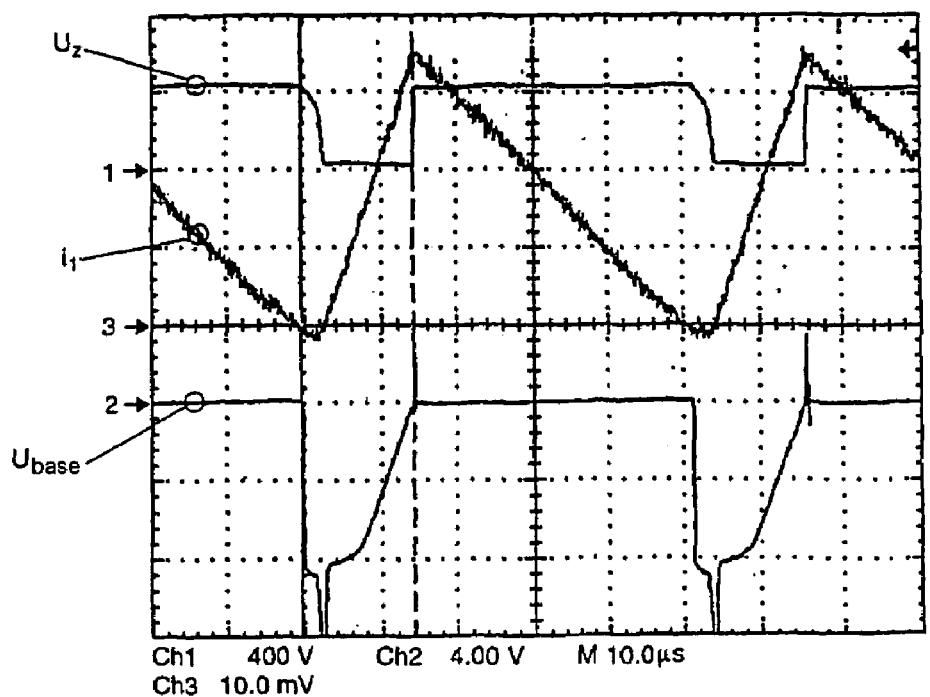
FIG. 4 shows the measured time characteristic of three signals of a realized exemplary embodiment.

FIG. 4 shows the time characteristic of the output voltage $u_z$ of the current $i_1$ and of the voltage $u_{base}$ across the base of the transistor $Q_2$ over time using an experimental design for a circuit arrangement according to the invention. The voltage peaks in the characteristics for the voltages $u_z$ and $u_{base}$ result from the recharge currents of the capacitor $C_1$ and lead to losses in the transistor $Q_2$, as long as they are not derived using optionally inserted diodes $D_{2a}$ and $D_{2b}$.

Figure 5:
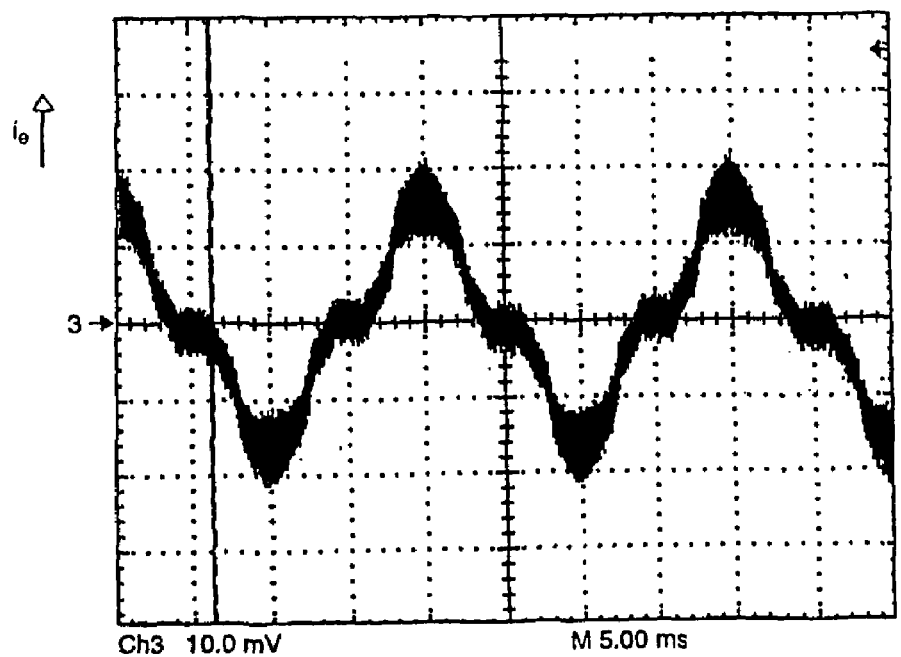
FIG. 5 shows the time characteristic, associated with FIG. 4, of the input current $i_e$.

FIG. 5 shows the time characteristic of the input current $i_e$ when driving using a sinusoidal system voltage $u_e$. In the region of the zero crossing of the system voltage $u_e$, the voltage across the inductance $L_1$ no longer reaches the output voltage $u_z$. Power transfer is thus not possible in this region for a very short period of time. These current distortions result in a harmonic content which can be tolerated depending on requirements. The additionally introduced third resistor $R_3$ between the base of the transistor $Q_2$ and the rectified input voltage can be used to largely compensate for this effect.

Figure 6:
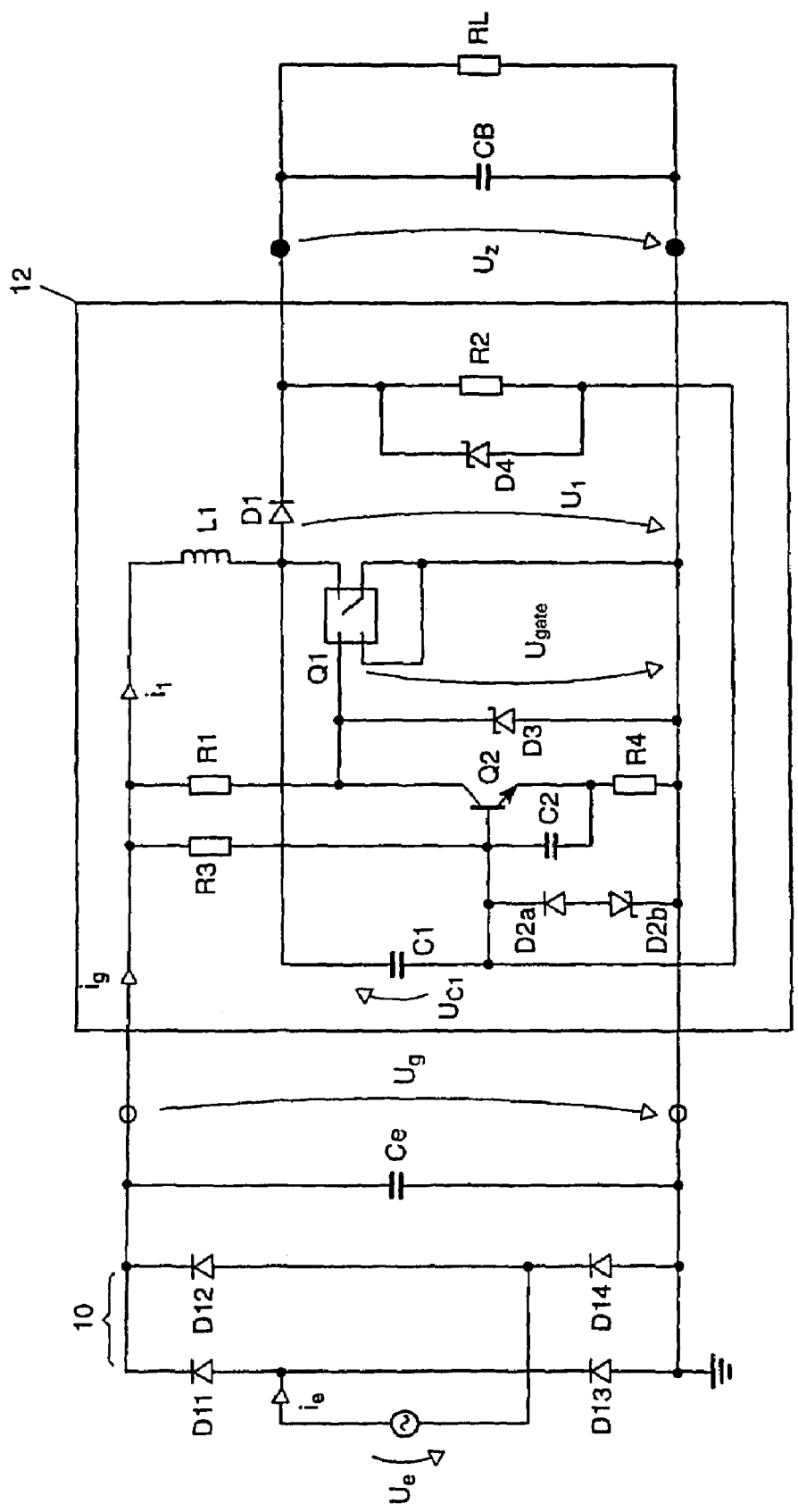
FIG. 6 shows a circuit diagram of a third embodiment of a circuit arrangement according to the invention.

FIG. 6 shows a further exemplary embodiment of the invention. In contrast to FIG. 2, a second capacitor C2 is connected between the control electrode and the reference electrode of the second switching element Q2. In addition, the reference electrode of the second switching element Q2 is connected to the reference potential via a fourth resistor R4. The second capacitor C2 eliminates one disadvantage which arises owing to the multiple function of the first capacitor C1. Firstly, the value of the first capacitor C1 determines the On time T1 of the first switching element Q1, and secondly the first capacitor C1 represents the positive feedback which maintains the oscillation of the entire circuit arrangement. In practice, changes in the voltage of several hundred volts occur across the first capacitor C1. As well as the desired value for the first capacitor C1, undesirably high charge and discharge currents result which entail high component loads. According to the invention, the second capacitor cancels out the multiple function of the first capacitor C1. The value for the second capacitor C2 is selected such that it essentially determines the On time T1 of the first switching element Q1. The value for the first capacitor C1 can then be selected to be so small that only its positive feedback function is maintained. The abovementioned charge and discharge currents can thus be reduced. The value for the fourth resistor R4 represents a further possible way of influencing both the positive feedback function of the first capacitor C1 and the On time T1 of the first switching element Q1. Fine tuning is thus possible. The value for the fourth resistor R4 may also be zero, however.

In summary, the circuit arrangement according to the invention results in particular in the following advantages:
  depletion, by virtue of the principle, of the transistors, brought about by the positive feedback by means of the capacitor $C_1$ when the transistor $Q_1$ turns off, makes possible low-loss switching of high currents;
  the capacitor $C_1$ or the capacitors $C_1$ and $C_2$ are responsible for dimensioning of the time $T_1$ and at the same time cause the transistor $Q_1$ to turn off in the zero crossing of the current $i_1$ in the inductance $L_1$;

the capacitor $C_1$ or the capacitors $C_1$ and $C_2$ make possible a "soft" commutation of the current $i_1$ at time $t_1$;

the variation in the output voltage $u_z$ as a result of a variation in the load is partially, i.e. linearly instead of quadratically, adjusted by the dependence of the time $T_1$ on the output voltage $u_z$.

What is claimed is:

1. A circuit arrangement for power factor correction having an input, to which an input voltage ($u_g$) can be connected, the input comprising a first and a second connection terminal;

a first switching element ($Q_1$) having a control electrode, a reference electrode and a working electrode, the control electrode being coupled to a current source and the reference electrode being coupled to a reference potential;

an inductance ($L_1$), which is coupled between the working electrode of the first switching element ($Q_1$) and the first connection terminal of the input;

an output, at which an output voltage ($u_z$) can be provided, the output comprising a first and a second output terminal;

a first diode ($D_1$), which is coupled between the working electrode of the first switching element ($Q_1$) and the first output terminal of the output;

a second switching element ($Q_2$) having a control electrode, a reference electrode and a working electrode, the reference electrode being coupled to the reference potential, and the working electrode being coupled to the control electrode of the first switching element ($Q_1$);

a first capacitor ($C_1$), which is coupled between the control electrode of the second switching element ($Q_2$) and the working electrode of the first switching element ($Q_1$); and a first nonreactive resistor ($R_2$), which is coupled between the first connection terminal of the output and the control electrode of the second switching element ($Q_2$).

2. The circuit arrangement as claimed in claim 1, characterized in that the current source, to which the control electrode of the first switching element ($Q_1$) is coupled, is realized by a second nonreactive resistor ($R_1$) which is coupled to the first connection terminal of the input.

3. The circuit arrangement as claimed in claim 1, characterized in that the current source, to which the control electrode of the first switching element ($Q_1$) is coupled, is realized by a separate low-voltage source having a high impedance.

4. The circuit arrangement as claimed in claim 1, characterized in that a first zener diode ($D_4$) is connected in parallel with the first nonreactive resistor ($R_2$) such that it can be used to limit the output voltage ($u_z$).

5. The circuit arrangement as claimed in claim 1, characterized in that the first switching element ($Q_1$) comprises an nmos transistor, and/or the second switching element ($Q_2$) comprises an npn transistor.

6. The circuit arrangement as claimed in claim 1, characterized in that the first switching element ($Q_1$) comprises a pmos transistor, and/or the second switching element ($Q_2$) comprises a pnp transistor.

7. The circuit arrangement as claimed in claim 1, characterized in that the circuit arrangement is designed such that, during a zero crossing of the current ($i_1$) through the inductance ($L_1$), the first switching element ($Q_1$) opens.

8. The circuit arrangement as claimed in claim 1, characterized in that a third nonreactive resistor ($R_3$) is coupled between the control electrode of the second switching element ($Q_2$) and the first connection terminal of the input.

9. The circuit arrangement as claimed in claim 1, characterized in that the series circuit comprising a second diode ($D_{2a}$) and a second zener diode ($D_{2b}$) is coupled between the control electrode and the reference electrode of the second switching element ($Q_2$) such that the second zener diode ($D_{2b}$) limits the voltage between the control electrode and the reference electrode of the second switching element ($Q_2$) in the reverse direction, and the second diode ($D_{2a}$) prevents a short circuit of the control electrode of the second switching element ($Q_2$) with respect to its reference electrode by means of the second zener diode ($D_{2b}$).

10. The circuit arrangement as claimed in claim 1, characterized in that the control electrode of the first switching element ($Q_1$) and the working electrode of the second switching element ($Q_2$) are coupled to the reference potential by means of a third zener diode ($D_3$), the third zener diode ($D_3$) being arranged such that it can be used to protect the control electrode of the first switching element ($Q_1$) against overvoltages.

11. The circuit arrangement as claimed in claim 1, characterized in that a second capacitor (C2) is connected between the control electrode of the second switching element ($Q_2$) and the reference electrode of the second switching element ($Q_2$), and the value for the second capacitor (C2) is so great that it can be used to substantially influence the On time (T1) of the first switching element (Q1).

* * * * *